T. H. BUFF.
TRANSFORMABLE VEHICLE BODY.
APPLICATION FILED OCT. 10, 1907.
914,334.
Patented Mar. 2, 1909.
2 SHEETS—SHEET 2.
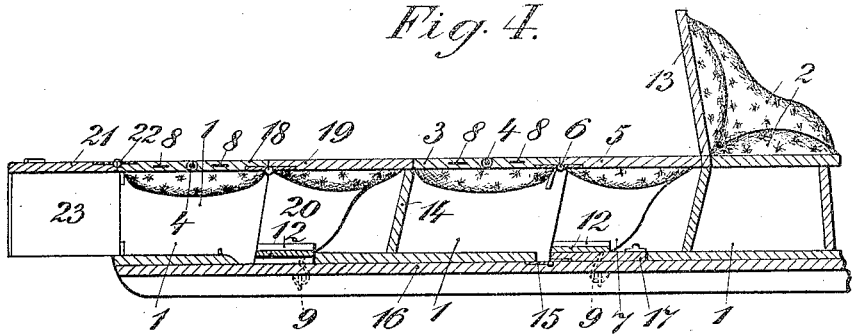
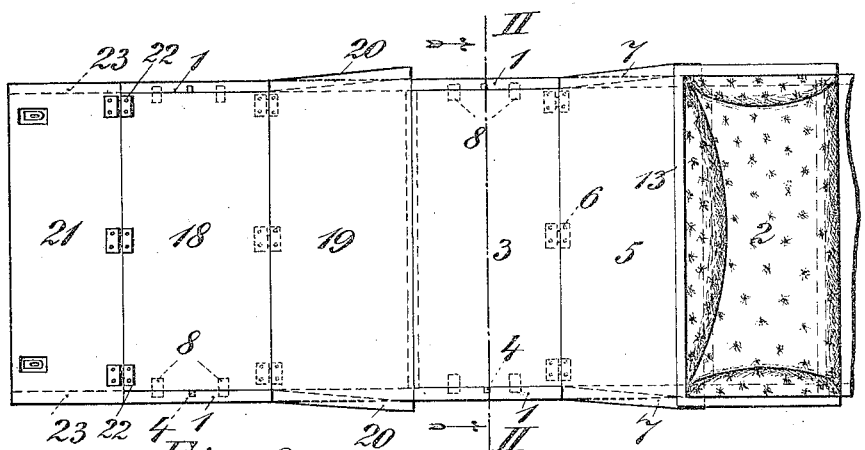
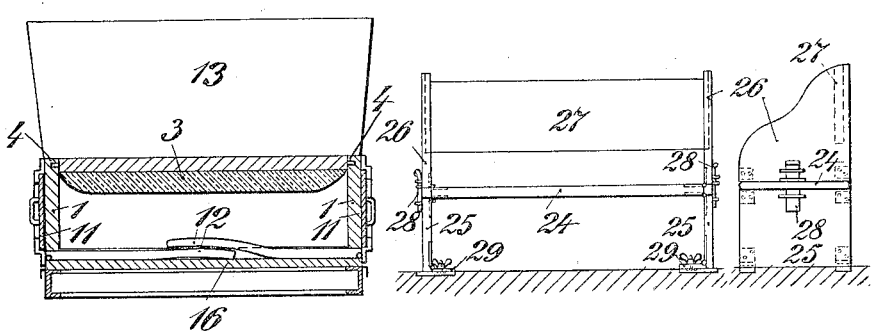
Witnesses:
Berthold R. Paulke
Harry Crowley
Inventor:
Theodore Henri Buff

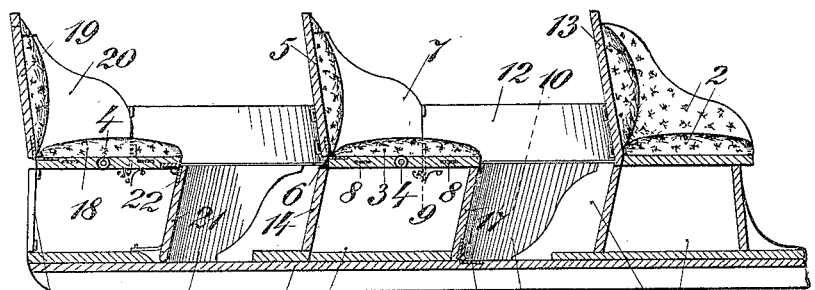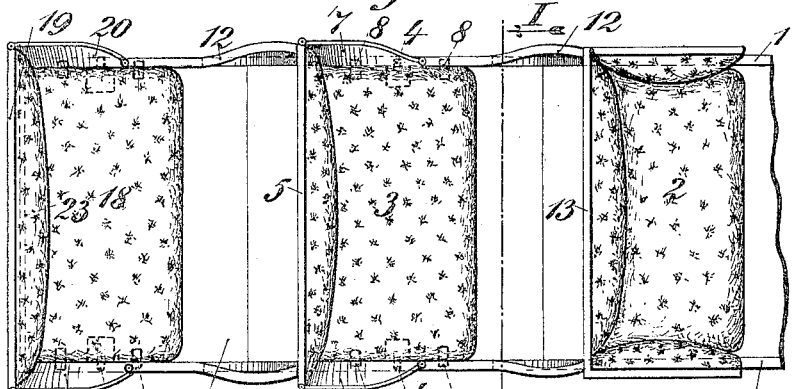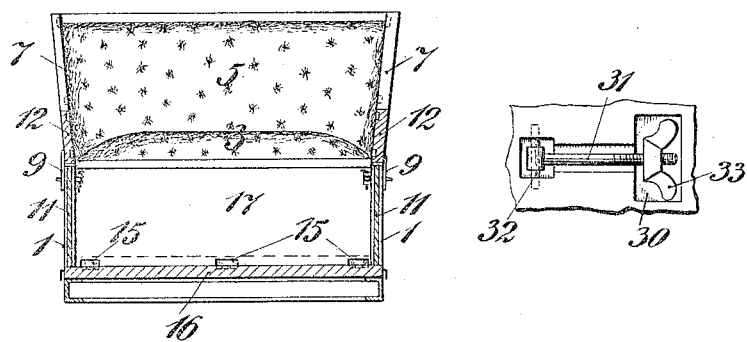

UNITED STATES PATENT OFFICE.

THÉODORE HENRI BUFF, OF OYONNAX, FRANCE.

TRANSFORMABLE VEHICLE-BODY.

No. 914,334. Specification of Letters Patent. Patented March 2, 1909.

Application filed October 10, 1907. Serial No. 396,830.

*To all whom it may concern:*

Be it known that I, THÉODORE HENRI BUFF, a citizen of the French Republic, and resident of Oyonnax, Ain, France, have invented certain new and useful Improvements in Transformable Vehicle-Bodies, of which the following is a specification.

My invention relates to improvements in vehicles—particularly motor-vehicles—and has for its object a transformable vehicle-body enabling a vehicle to be adapted in a quick and simple manner, for either passenger or goods traffic and also for the transportation of passengers and goods at the same time.

The principal features of this invention consist therein, that the seats are fixed pivotally in the body of the vehicle and that the seat backs are fixed to the seats by joints; so that, by turning the seats around 180° the seats and backs together completely close up the top of the body of the vehicle, while the sides of the seats close up the sides of the said body. In this manner the whole body of the vehicle is completely covered in and the platform thus constructed, as well as the inside of the vehicle body can then be employed for carrying goods. But also special foldable benches which would ordinarily be put under the seats, could be carried, and, when necessary fastened to the platform, thus making it possible to transport both passengers and goods.

My invention is illustrated by the accompanying drawings in which—

Figure 1 is a longitudinal section of the body of the vehicle when arranged in its ordinary form for the carrying of passengers. Fig. 2 is a plan view of the vehicle-body as shown in Fig. 1. Fig. 3 is a cross-section on lines I—I of Fig. 2. Fig. 4 shows a longitudinal section of the vehicle-body when same is arranged for the transportation of goods. Fig. 5 is a plan-view, according to Fig. 4. Fig. 6 is a cross-section on line II—II of Fig. 5. Figs. 7 and 8 show in a front and side view respectively, a foldable bench which can be fastened on the vehicle-body when same is arranged for goods transportation. Fig. 9 shows a clamp-screw for the purpose of fastening the benches to the vehicle-body.

On the side-boards 1 of the vehicle (which are of a suitable form) the seat 2 of the driver is fastened in front in the usual manner, and behind same the seat 3 is turnably arranged by means of pivots 4 to the side boards 1. The seat-back 5 is fastened by means of joints 6 to the seat 3. In like manner the seat-sides 7 are, by means of joints or similar contrivances, fastened to the seat back 5. The seat 3 is, by means of four lock-bolts 8 of suitable construction and which engage into the side-boards, held in the position shown in Fig. 1. On the seat sides 7 the hooks 9 are fixed, which fit into hooks or eyes arranged on the side boards 1, and thus hold the seat-sides in position, while the whole seat is in this manner likewise held together. Naturally this can also be brought about by means of any other suitable arrangements.

Between the two seats each of the side boards 1 is provided with a stepping-in opening 10, the size of which equals that of the seat-sides 7 and which has also a corresponding inverted-form to that of the seat-sides 7. In the side-walls 1, the sliding doors 11 are arranged (Fig. 3) by means of which the stepping-in openings are closed up. These sliding doors can naturally also be arranged between the side-boards of the vehicle-body and its outer-metal covering (Fig. 6). On each of the seat-sides 7 there is a leaf 12 which forms the continuation of the sliding door 11, and which is so pivotally arranged as to be movable either inwards or outwards. The free end of this leaf 12 is, by means of a spring lock-bolt or the like, fastened in an easily detachable manner to the back 13 of the fore-seat 2. This leaf 12 could also at the same time serve as a guide for the sliding-door 11, but it could moreover be left off entirely. Under the seat 3 is a fast cross wall 14, and also a pivotally arranged cross wall 17 fastened by means of joints 15 in the bottom 16 of the vehicle body, this latter wall being held fast in its position by means of lock-bolts or the like. On these two walls the seat 3 rests in the position shown in Figs. 1 and 2. The back seat 18 with seat-back 19 and seat-sides 20 is pivotally arranged in the same manner as seat 3, only in this case the front cross-wall 21 is fastened by means of joints 22 to the seat itself. The vehicle-body is closed behind by the doors 23 which are pivotally fastened on the side-board 1.

As will be readily seen from the form shown in Figs. 1-3, the vehicle body is here arranged for passenger-service. In order to adapt same for goods traffic, the four side lock-bolts 8 on seat 3 are first withdrawn and then the seat-sides 7 fastened by the hooks 9 to the side-walls 1 are unloosened.

After turning down the cross-walls 17—and naturally after having drawn back the sliding doors 11—the seat 3 is turned around 180° on the pivots 4. The seat-sides 7 not being connected with the seat 3 but only arranged to the seat-back 5, the latter can, by turning the seat 3, be moved in such a manner that it comes to lie in the elongation of the said seat 3, so that the seat-back 5 lies level with the seat 3 (Figs. 4 and 5). Hereby the seat sides 7 lie in and fill up the stepping in opening 11, for, as already mentioned, the latter have the same size and form as those of the seat-sides 7. The leaves 12 which by the turning of the seat have been forced inwards, now lie above one another on the bottom 17 of the vehicle body (Fig. 6). The hooks 9 of the seat sides 7 are now fastened into eyes fixed on the side-boards of the vehicle (Fig. 4) and by means of which the seat-side 7 and the seat-back 5 are secured into their position. At the same time the lock-bolts 8 are again inserted into the seat 3, so that also the latter is held in its position. In a similar manner the seat 18 is also turned around 180°, whereby the same is likewise brought on a level with the seat-back 19. The cross-wall 21 which is fastened to the said seat 18 forms, after the turning of the latter, a rear-elongation of same, and the platform constructed by the seats 3 and 18 and the seat-backs 5 and 19 is thus considerably lengthened. For the supporting of the elongation 21 the two doors 23 are brought into the position shown in Figs. 4 and 5 and fastened in a suitable manner to the elongation 21. The vehicle-body is thus completely closed in on sides and top,—as previously described—and the inside and the platform can now serve for the carrying of goods. But also on the platform can be fixed foldable benches (Figs. 7 and 8)—which are otherwise carried under the driver's seat. These seats consist of a cross board 24 on which both the supports 25 and the side boards 26 are pivotally fastened. The supports and side-boards are held in position when in use by a common cross-lock-bolt or by a pin 28 which is fastened to the outer side of the two parts. In a groove with which both of the side-boards 26 are provided, a cross-board 27 which is to serve as a seat back, is fixed, and at the same time it secures the side boards 26 in their position for use. On the bottom end of the supports 25 there are turnable lap-plates 29 by the means of which the benches are fastened on the platform of the vehicle-body. For this purpose the screw bolts 31, turnable around the pivots 32 are arranged in the suitably cut-out places 30 in the platform, that is, on the under-side of the seats, on the rear-side of the seat-backs, and in the cross-wall 21. These bolts 31 are inserted in holes in the lap-plates 29 and by tightening up the thumb screws 33 the said lap-plates are fastened to the platform, thus securing the benches to the latter. In this third form, the vehicle can be used for carrying both passengers and goods,—the goods being placed in the inside of the vehicle body. To again adapt the vehicle for passenger use only, the transformation is naturally made in the contrary way to the one already described.

In order to hide any defacement on the rear-side of the seat-backs, which may occur while the vehicle is being used for goods-traffic, a cover of cloth, leather, or other suitable material, could be so fixed on the seat-backs as to be easily detachable, when the vehicle is used for passenger transport. The fastening and securing of the separate parts, in their different positions, can naturally also be done in various ways to the one described, also any desired number of seats can be employed.

What I do claim as my invention and desire to secure by Letters Patent is:—

1. In a transformable vehicle body, in combination, side boards of suitable form, seats arranged in the said side-boards and turnable round their middle-axles, seat-backs hinged to the said seats and adapted to be brought in the elongation of the turned seats and to close the space between said seats, seat-sides fastened to said seat-backs, stepping-in openings in the said side boards, the said seat-sides having a size and form corresponding to that of the said stepping-in openings and adapted to close the latter, when the said seats are turned, and means for securing the said seats and seat backs in their different positions, substantially as and for the purpose set forth.

2. In a transformable vehicle body, in combination, side boards of suitable form, seats turnably arranged on pivots in the said side-boards, seat-backs fastened by hinges to the said seats, seat-sides pivotally fixed to the seat-backs, stepping-in openings in the said side-boards and having a size and form corresponding to that of the seat-sides, the latter being adapted to fill up the said stepping-in openings, sliding-doors for closing up the latter, cross walls under the seats for supporting same, one of which cross-walls is turnably arranged and the other fast, and detachable means for fastening and securing the said seats, seat-backs and seat sides in their different positions, substantially as set forth.

3. In a transformable vehicle-body, in combination, side-boards of suitable form, seats turnably arranged on pivots in the said side boards, seat-backs fastened by hinges to the said seats, seat sides pivotally fixed to the seat-backs, stepping in openings in the said side-boards and having a size and form corresponding to that of the seat sides, the latter adapted to fill up the said stepping-in openings, sliding doors for closing up the latter, cross-walls under the seats for supporting same, one of which cross-walls is fast and the other turnably arranged in the bottom of the vehicle-body, a cross-wall under the rear-seat, pivotally fastened to same, and adapted to form an elongation of the seat, when the latter is turned around 180°, doors under the said rear-seat, pivotally fastened to the said side-board, and adapted to support the said elongation, and detachable means for fastening and securing all the said movable parts in their different positions, substantially as set forth.

4. In a transformable vehicle-body, in combination, side-boards of suitable form, seats turnably arranged on pivots in the said side-board, seat-backs fastened by hinges to the said seats, seat-sides pivotally fixed to the seat-backs, stepping-in openings in the said side boards and having a size and form corresponding to that of the seat-sides, the latter adapted to fill up the said stepping-in openings, sliding doors for closing up the latter, the leaves pivotally arranged to the seat-sides, and adapted to form a continuation to the said sliding-doors, cross walls under the seats for supporting same, one of which cross-walls is fast and the other turnably arranged in the bottom of the vehicle body, a cross-wall under the rear-seat, pivotally fastened to same, and adapted to form an elongation of the seat, when the latter is turned around 180°, doors under the said rear-seat, pivotally fastened to the said side-boards, and adapted to support the said elongation and detachable means for fastening and securing all the said movable parts in their different positions, foldable benches adapted to be fastened to the vehicle-body and consisting of a cross board, sides pivotally fastened to the latter, supports also pivotally fastened to the said cross-board and a seat-back detachably arranged between the said seat-sides, and means for fastening the said foldable benches to the vehicle-body, substantially as set forth.

In testimony whereof I have hereunto signed my name this 21st day of September 1907, in the presence of two subscribing witnesses.

THÉODORE HENRI BUFF.

Witnesses:
   FRANÇOIS LARRIEUE,
   HENRI MOERCH.